United States Patent
Ueno (10) Patent No.: US 7,444,218 B2
(45) Date of Patent: Oct. 28, 2008

(54) VEHICLE OCCUPANT PROTECTION SYSTEM

(75) Inventor: Yukiyasu Ueno, Nishio (JP)

(73) Assignee: Denso Corporation, Kariya (JP)

( * ) Notice: Subject to any disclaimer, the term of this patent is extended or adjusted under 35 U.S.C. 154(b) by 770 days.

(21) Appl. No.: 11/085,119

(22) Filed: Mar. 22, 2005

(65) Prior Publication Data

US 2005/0209756 A1 Sep. 22, 2005

(30) Foreign Application Priority Data

Mar. 22, 2004 (JP) .............................. 2004-082192

(51) Int. Cl.
*B60R 22/00* (2006.01)

(52) U.S. Cl. ......................................... 701/45; 701/47

(58) Field of Classification Search ............. 701/45–47; 280/734, 735; 180/271
See application file for complete search history.

(56) References Cited

U.S. PATENT DOCUMENTS

| 5,825,098 | A | 10/1998 | Darby et al. | |
|---|---|---|---|---|
| 6,530,597 | B1 | 3/2003 | Nesper et al. | |
| 6,563,326 | B1 | 5/2003 | Huebsch | |
| 6,566,765 | B1 | 5/2003 | Nitschke et al. | |
| 6,944,527 | B2 * | 9/2005 | Dell' Eva et al. | 701/45 |
| 7,359,527 | B2 * | 4/2008 | Breed et al. | 382/100 |
| 7,359,782 | B2 * | 4/2008 | Breed | 701/45 |

* cited by examiner

*Primary Examiner*—Richard M. Camby
(74) *Attorney, Agent, or Firm*—Posz Law Group, PLC

(57) ABSTRACT

A vehicle occupant protection system includes a plurality of satellite sensors, a control unit, and a plurality of bus lines. The satellite sensors detect a vehicle condition in a vehicle collision or a rollover event. The control unit determines an occurrence of the vehicle collision or the rollover event based on output signals from the satellite sensors and controls activation of an occupant protection unit. The bus lines bus-connect the control unit and the satellite sensors. Three or more of the satellite sensors are connected in series. One of the satellite sensors that is connected in series is operable to determine at least two different collision or rollover events and is bus-connected closest to the control unit.

18 Claims, 5 Drawing Sheets

VEHICLE OCCUPANT PROTECTION SYSTEM

CROSS REFERENCE TO RELATED APPLICATIONS

This application is based upon and claims the benefit of priority of Japanese Patent Application No. 2004-82192, filed on Mar. 22, 2004, the contents of which are incorporated herein by reference.

FIELD OF THE INVENTION

The present invention relates to a vehicle occupant protection system and, more particularly, to a communication configuration between a control unit and a plurality of satellite sensors of a vehicle occupant protection system.

BACKGROUND OF THE INVENTION

There are known vehicle occupant protection systems in which a control unit and satellite sensors are connected through bus lines (see, for example, published Japanese patent documents JP-A-2002-529292 and JP-A-2001-512395).

In the system disclosed in JP-A-2002-529292, the bus lines are connected in a ring configuration, whereas the bus lines are connected in a point-to-point and daisy chain configuration in the system disclosed in JP-A-2001-512395. The ring and point-to-point configurations have a complex bus line layout and require many cables, which leads to a cost increase. The daisy chain configuration has the advantage of lower cost, but on the other hand, a cable disconnection will disable all the satellite sensors downstream of the disconnected point of the cable. The technique in JP-A-2001-512395 therefore utilizes a combination of both the point-to-point and daisy chain configurations so as to reduce the disadvantages of the daisy chain.

SUMMARY OF THE INVENTION

In view of the problems encountered by the conventional techniques as described above, an object of the present invention is to provide a vehicle occupant protection system which is capable of making effective use of cascade connection such as daisy chain connection by substantially reducing the disadvantages of the cascade connection.

The vehicle occupant protection system according to one aspect of the invention comprises a plurality of satellite sensors capable of detecting a vehicle condition in a vehicle collision or rollover event, a control unit for determining a vehicle collision or rollover event based on output signals from the satellite sensors and for controlling activation of an occupant protection unit, and bus lines for bus-connecting the control unit and the satellite sensors. The characteristic feature of the invention is that, of the three or more satellite sensors that are connected through the same series of bus lines, the satellite sensor that is used for the determination of two or more different collision or rollover events is bus-connected closer to the control unit.

That is, the satellite sensor that is used for the determination of two or more different collision or rollover events is bus-connected closer to the control unit than the satellite sensors that are used for the determination of one collision or rollover event. The collision or rollover event includes a front collision, a side collision, a rear collision, and a rollover. The vehicle condition that the satellite sensors can detect includes acceleration generated in the vehicle in a front to back direction, a left to right direction, and an up and down direction, roll rate generated in the vehicle, and pressure generated in the vehicle.

The satellite sensors of the vehicle occupant protection system may comprise a lateral acceleration center sensor located substantially along a centerline of the width of the vehicle and capable of detecting acceleration in a left to right direction of the vehicle, a plurality of left side sensors located on the left side of the vehicle for detecting a collision on the left side, and a plurality of right side sensors located on the right side of the vehicle for detecting a collision on the right side. The control unit may determine a left-side collision based on output signals from one or more of the lateral acceleration center sensor and the left side sensors. Likewise, the control unit may determine a right-side collision based on output signals from one or more of the lateral acceleration center sensor and the right side sensors. Two or more of the left and right side sensors and the lateral acceleration center sensor may be connected through the same series of bus lines, such that the lateral acceleration center sensor is bus-connected closer to the control unit than the other two or more side sensors. The two or more side sensors may be all either left side sensors or right side sensors.

In one embodiment of the invention, the left (or right) side sensors located on the left (or right) side of the vehicle may be lateral acceleration sensors capable of detecting acceleration in the left to right direction of the vehicle. Alternatively, the left (or right) side sensors located on the left (or right) side of the vehicle may be pressure sensors capable of detecting pressure applied on the left (or right) side of the vehicle. The bus lines may be configured as a daisy chain.

The vehicle occupant protection system according to another aspect of the invention comprises a front sensor located on a front side of a vehicle and capable of detecting acceleration in a front to back direction of the vehicle, one or more satellite sensors excluding the front sensor capable of detecting a vehicle condition in a vehicle collision or rollover event, a control unit for determining a vehicle collision or rollover event based on output signals from the front sensor and one or more satellite sensors and for controlling activation of an occupant protection unit, and bus lines for bus-connecting the control unit and the front sensor and one or more satellite sensors. The characteristic feature of the invention is that the front sensor is bus-connected closer to the control unit than the one or more satellite sensors that are connected through the same series of bus lines as the front sensor.

The satellite sensor may be at least one of side sensors located on the sides of the vehicle for detecting a side collision.

More specifically, the satellite sensor may be either one of a left side sensor and a right side sensor, which are respectively located on the left and right side of the vehicle for detecting a left-side collision and a right-side collision.

Two or more left side sensors and right side sensors may be provided. The left (or right) side sensors located on the left (or right) side of the vehicle may be lateral acceleration sensors capable of detecting acceleration in the left to right direction of the vehicle. Alternatively, the left (or right) side sensors located on the left (or right) side of the vehicle may be pressure sensors capable of detecting pressure applied on the left (or right) side of the vehicle. The bus lines may be configured as a daisy chain.

The vehicle occupant protection system according to yet another aspect of the invention comprises a plurality of satellite sensors capable of detecting a vehicle condition in a vehicle collision or rollover event, a control unit for determining a vehicle collision or rollover event based on output signals from the satellite sensors and for controlling activation of occupant protection units, and bus lines for bus-connecting the control unit and the satellite sensors. The characteristic feature of the invention is that, of the satellite sensors that are connected through the same series of bus lines, a fewer number of satellite sensors for detecting a vehicle condition of the same kind are bus-connected nearer to the control unit.

The satellite sensors may comprise a rollover detection sensor for detecting a vehicle condition in a vehicle rollover event, and a plurality of side sensors located on the sides of the vehicle for detecting a side collision of the vehicle. The rollover detection sensor may be bus-connected nearer to the control unit than the side sensors. The rollover detection sensor is at least one of a roll rate sensor capable of detecting roll rate generated in the vehicle, an up and down acceleration sensor capable of detecting acceleration in an up and down direction of the vehicle, and a lateral acceleration sensor capable of detecting acceleration in a left to right direction of the vehicle. Preferably, the rollover detection sensor may be located substantially along a centerline of the width of the vehicle. The bus lines may be configured as a daisy chain.

According to yet another aspect of the invention, the satellite sensor that is used for the determination of several different collision or rollover events is connected on the side nearer to the control unit where it is less susceptible to the effects of a bus line disconnection. Thereby, in the event of a bus line disconnection, the system can still detect a vehicle collision or rollover event by an intact sensor with higher probability.

More specifically, for example, let us consider a case where a lateral acceleration center sensor used for determination of a left-side collision and a right-side collision, i.e., two or more different vehicle collision or rollover events, and two right side sensors used for determination of a right-side collision, i.e., one vehicle collision or rollover event, are connected through the same series of bus lines. The satellite sensors are bus-connected nearer to the control unit in the order of the lateral acceleration center sensor, first right side sensor, and second right side sensor. When the bus line that connects the control unit and the lateral acceleration center sensor is disconnected, all of the lateral acceleration center sensor and two right side sensors are disabled. In this case, therefore, the system cannot determine a right- or left-side collision using the lateral acceleration center sensor and two right side sensors. However, when the bus line that connects the lateral acceleration center sensor and the first right side sensor is disconnected, only the right side sensors are disabled. In this case, therefore, while the system cannot determine a right-side collision using the two right side sensors, the system can still determine a left-side collision using the lateral acceleration center sensor.

Likewise, when the bus line that connects the first right side sensor and second right side sensor is disconnected, only the second right side sensor is disabled. In this case, while the system cannot fully function for the determination of a right-side collision because of the disabled second right side sensor, the system can still determine a left-side collision using the lateral acceleration center sensor.

Thus, by connecting the satellite sensor that is used for the determination of two or more different collision or rollover events nearer to the control unit, the damage of a bus line disconnection in cascade connection is minimized. That is, the disadvantage of cascade connection is reduced to make good use thereof, as a result of which a cost reduction is achieved.

According to still another aspect of the invention, the front sensor is connected on the side nearer to the control unit where it is less susceptible to the effects of a bus line disconnection, while the other satellite sensors are connected farther from the control unit. Thereby, the system can avoid a situation with higher probability where the front sensor is disabled and the system cannot determine a front collision, which is the most frequent case of all the vehicle collision or rollover events.

More specifically, for example, let us consider a case where a front sensor and a side sensor are connected through the same series of bus lines. The front sensor is bus-connected nearer to the control unit than the side sensor. When the bus line that connects the control unit and the front sensor is disconnected, both of the front sensor and side sensor are disabled. In this case, therefore, the system cannot determine a front collision and a side collision using the front sensor and side sensor. However, when the bus line that connects the front sensor and side sensor is disconnected, only the side sensor is disabled. In this case, therefore, while the system cannot determine a side collision using the side sensor, the system can still determine a front collision using the front sensor. That is, the front sensor used for determination of a front collision, which is the most frequent case of all the vehicle collision or rollover events, can be maintained intact with higher probability.

Thus, by connecting the front sensor nearer to the control unit, the damage of a bus line disconnection in cascade connection is minimized. That is, the disadvantage of cascade connection is reduced to make good use thereof, as a result of which a cost reduction is achieved.

According to still another aspect of the invention, a fewer number of satellite sensors for detecting a vehicle condition of the same kind are bus-connected nearer to the control unit where they are less susceptible to the effects of a bus line disconnection. A larger number of satellite sensors for detecting a vehicle condition of the same kind are therefore connected farther from the control unit. Thereby, in the event of a bus line disconnection, the system can still detect a vehicle collision or rollover event by intact sensors with higher probability. More specifically, for example, let us consider a case where a roll rate sensor for detecting a vehicle rollover and two side sensors used for determination of a side collision are connected through the same series of bus lines.

The satellite sensors are bus-connected nearer to the control unit in the order of the roll rate sensor, first side sensor, and second side sensor. When the bus line that connects the control unit and the roll rate sensor is disconnected, all of the roll rate sensor and two side sensors are disabled. In this case, therefore, the system cannot determine a rollover and a side collision using the roll rate sensor and two side sensors. However, when the bus line that connects the roll rate sensor and the first side sensor is disconnected, only the first and second side sensors are disabled. In this case, therefore, while the system cannot determine a side collision using the two side sensors, the system can still determine a rollover using the roll rate sensor. Likewise, when the bus line that connects the first side sensor and second side sensor is disconnected, only the second side sensor is disabled. In this case, while the system cannot fully function for the determination of a side collision because of the disabled second side sensor, the system can still determine a rollover using the roll rate sensor.

If the roll rate sensor were connected farther from the control unit with one or more side sensors interposed therebetween, then a bus line disconnection would immediately affect the system's abilities of detecting a side collision as well as a rollover. Thus, in the system where one satellite sensor for detecting a vehicle rollover and two or more side sensors are connected through the same series of bus lines, the rollover detection sensor should be connected nearer to the control unit, so that a bus line disconnection does not immediately affect the determination of a rollover. Thereby, the damage of a bus line disconnection in cascade connection is minimized. That is, the disadvantage of cascade connection is reduced to make good use thereof, as a result of which a cost reduction is achieved.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Below, the invention is described in more detail in the form of preferred embodiments.

Figure 1:
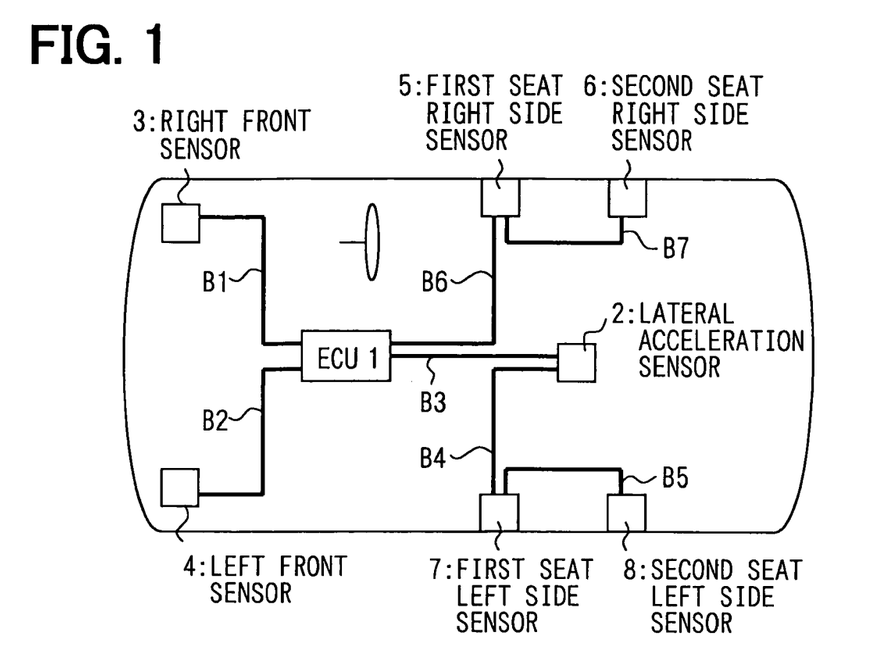
FIG. 1 is a plan view of a vehicle including a vehicle occupant protection system according to a first embodiment of the present invention.

The overall structure of a first embodiment of the vehicle occupant protection system is described with reference to FIG. 1. As shown in the drawing, the system includes an electronic control unit (ECU) 1, a plurality of satellite sensors 2-8, and bus lines B1-B7 that respectively connect the sensors to the ECU 1. The ECU 1 is located substantially at the center of the vehicle. The ECU 1 determines a collision or rollover event of the vehicle and activates occupant protection units such as airbags.

The satellite sensors 2-8 are located outside the ECU 1 in associated parts of the vehicle. Each sensor detects a vehicle condition in accordance with their respective locations. More specifically, the satellite sensors comprise a lateral acceleration (center) sensor 2, a right front sensor 3, a left front sensor 4, a first seat right side sensor 5, a second seat right side sensor 6, a first seat left side sensor 7, and a second seat left side sensor 8. The lateral acceleration sensor 2 is located in the rear of the ECU 1 substantially along a centerline of the width of the vehicle. Its location in the front to back direction is in the middle between the first seat side sensors and second seat side sensors. The lateral acceleration sensor 2 detects acceleration generated in the vehicle in a left to right direction (lateral acceleration).

The right front sensor 3 is disposed on the right front side, and the left front sensor 4 on the left front side of the vehicle. The right and left front sensors 3, 4 detect acceleration generated in the front to back direction of the vehicle. The first seat right side sensor 5 is disposed on the right side face of the first seat, i.e., near the B pillar on the right side of the driver's seat. The second seat right side sensor 6 is disposed on the right side face of the second seat, i.e., near the C pillar on the right side of the rear seat behind the driver's seat. The first seat left side sensor 7 is disposed on the left side face of the first seat, i.e., near the B pillar on the left side of the front passenger's seat. The second seat left side sensor 8 is disposed on the left side face of the second seat, i.e., near the C pillar on the left side of the rear seat behind the front passenger's seat.

The bus lines B1-B7 connect the satellite sensors with the ECU 1 or with each other. Bus line B1 connects the right front sensor 3 with the ECU 1. Bus line B2 connects the left front sensor 4 with the ECU 1. Bus line B3 connects the lateral acceleration sensor 2 with the ECU 1. Bus line B4 connects the lateral acceleration sensor 2 with the first seat left side sensor 7. Bus line B5 connects the first seat left side sensor 7 with the second seat left side sensor 8. Bus line B6 connects the first seat right side sensor 5 with the ECU 1. Bus line B7 connects the first seat right side sensor 5 with the second seat right side sensor 6.

Figure 2:
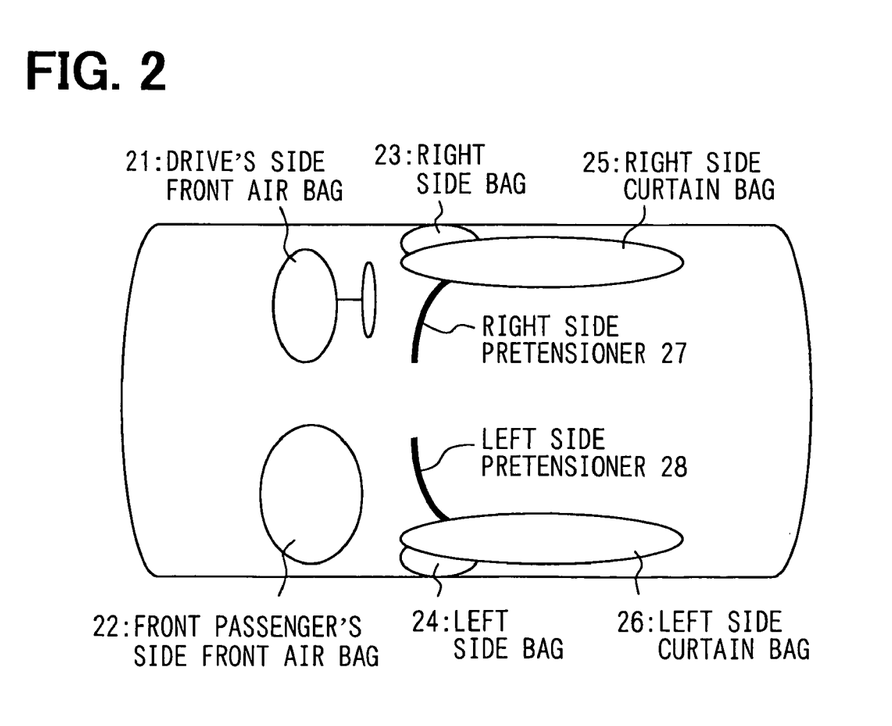
FIG. 2 is a plan view of a vehicle including a plurality of occupant protection units.

FIG. 2 shows occupant protection units that are activated by the ECU 1, including a driver's side front air bag 21, a front passenger's side front air bag 22, a right side bag 23, a left side bag 24, a right side curtain bag 25, a left side curtain bag 26, a right side pretensioner 27, and a left side pretensioner 28. Since these protection units are well known, they will not be described in detail.

Figure 3:
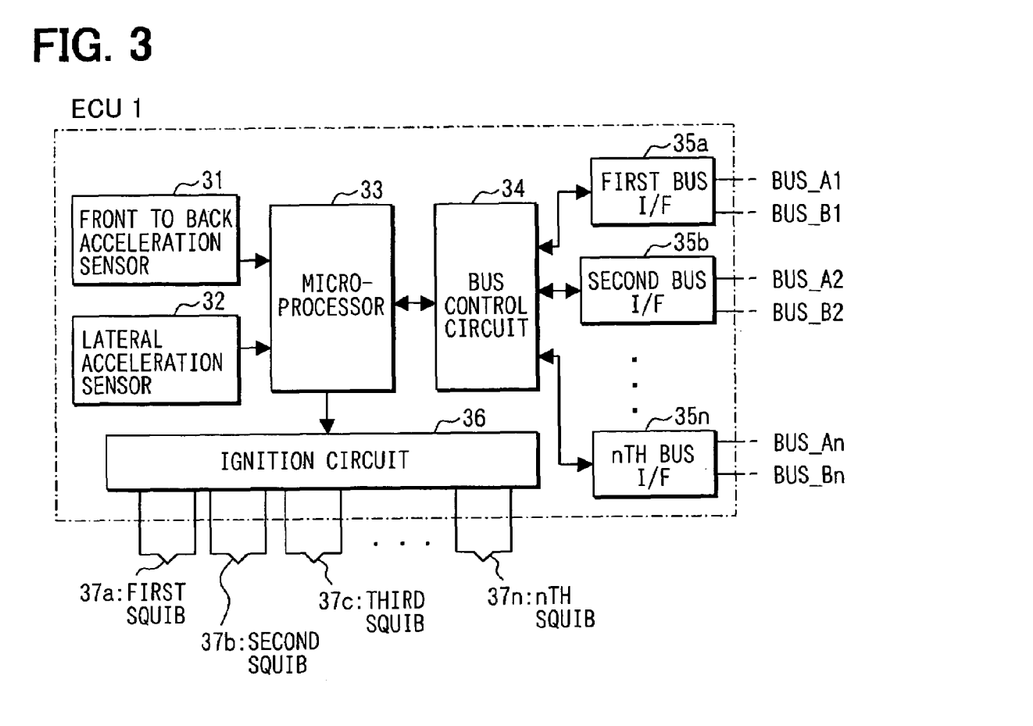
FIG. 3 is a block diagram of an electronic control unit of the vehicle occupant protection system of FIG. 1.

Next, the structure of the ECU 1 is described in detail with reference to the block diagram of FIG. 3. As shown, the ECU 1 includes a front to back acceleration sensor 31, a lateral acceleration sensor 32, a microprocessor 33, a bus control circuit 34, bus interfaces (I/Fs) 35a-35n, and an ignition circuit 36. The front to back acceleration sensor 31 detects acceleration generated in the front to back direction of the vehicle, more specifically, at a location at which the ECU 1 is disposed. The lateral acceleration sensor 32 detects acceleration generated in the left to right direction of the vehicle, more specifically, at a location at which the ECU 1 is disposed. The microprocessor 33 determines a collision or rollover event of the vehicle based on the signals input from the front to back acceleration sensor 31 and lateral acceleration sensor 32 that are built in the ECU 1 and signals input from the satellite sensors 2-8 over the bus I/Fs 35a-35n and bus control circuit 34. The microprocessor 33 then outputs a signal to the ignition circuit 36 in accordance with the determination results of the collision or rollover event.

The ignition circuit 36 supplies energizing current to respective squibs 37a-37n of associated occupant protection units such as the driver's side front air bag 21, based on the output signals from the microprocessor 33. For example, if a signal indicative of a front crash is input from the microprocessor 33, power is supplied to the squibs of the protection units provided in precaution of a front crash. The ignition circuit 36 thus controls activation of the occupant protection units based on output signals from the microprocessor 33. The bus I/Fs 35a-35n are connected to the bus control circuit 34, and two bus lines BUS_A and BUS_B are connected to each bus interface.

Figure 4:
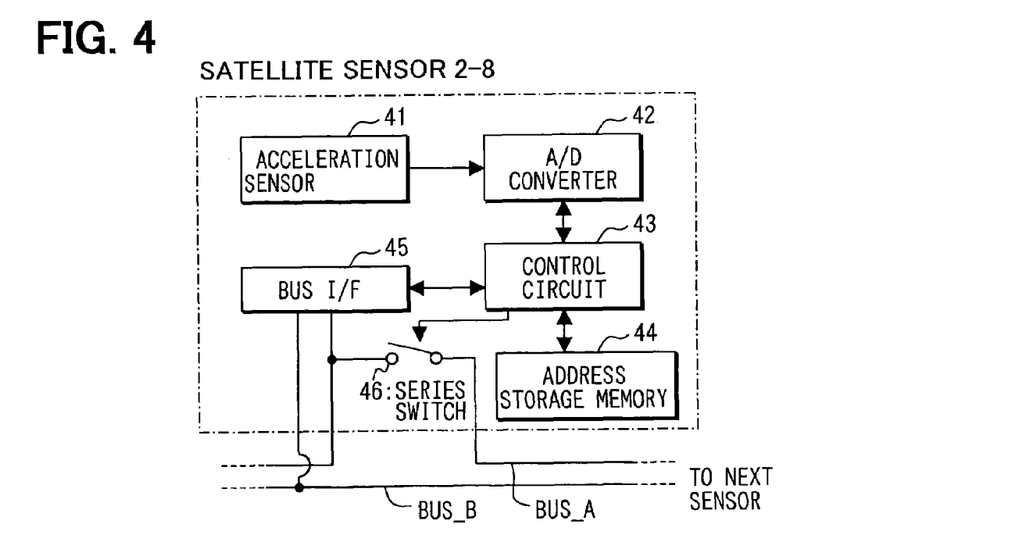
FIG. 4 is a block diagram of a satellite sensor of the vehicle occupant protection system of FIG. 1.

Next, the satellite sensors 2-8 are described in further detail with reference to FIG. 4. Each satellite sensor includes an acceleration sensor 41, an A/D converter 42, a control circuit 43, an address storage memory 44, a bus interface (I/F) 45, and a series switch 46. The acceleration sensor 41 detects acceleration in accordance with respective locations of the satellite sensors. For example, the acceleration sensors 41 of the right and left front sensors 3, 4 detect acceleration in the front to back direction of the vehicle. The acceleration sensors 41 of the lateral acceleration sensor 2 and side sensors 5-8 detect acceleration in the left to right direction of the vehicle.

The A/D converter 42 converts analog signals output from the acceleration sensor 41 into digital signals. The series switch 46 is inserted in series to the BUS_A line and is opened or closed to cut or establish communication between the ECU 1 and the satellite sensor on the downstream side (away from the ECU 1). The series switch 46 is ON by default but operated on and off to select each satellite sensor for address setting when power is on and the system is reset. This address setting process is called an auto addressing function. The series switch 46 is opened and closed and addresses are stored in the address storage memory 44 by the control circuit 43 by this auto addressing function. After the address setting, the control circuit 43 receives a signal request command from the ECU 1 through the BUS_A line and bus I/F 45, upon which the control circuit 43 outputs A/D-converted acceleration signals from the acceleration sensor 41 to the ECU 1 through the bus I/F and BUS_B line. As the auto addressing function is known in the art, for example, as disclosed in Published Japanese Translation of PCT International Application No. 2002-520724, it will not be described in detail.

Figure 5:
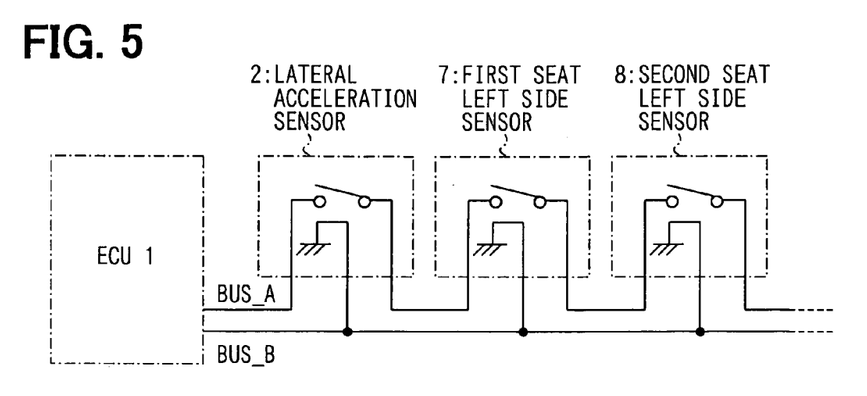
FIG. 5 is a schematic diagram of a bus connection configuration of the vehicle occupant protection system of FIG. 1.

FIG. 5 shows one configuration wherein the ECU 1, lateral acceleration sensor 2, first seat left side sensor 7, and second seat left side sensor 8 are connected through the same series of bus lines. As shown, the BUS_A line is connected to each sensor via the series switch 46 (as shown in FIG. 4), while the BUS_B line is connected to the sensor in series. The sensors are thus connected in a daisy chain. Turning to FIG. 1, the lateral acceleration sensor 2, first seat left side sensor 7, and second seat left side sensor 8 are connected through the same series of bus lines, and the first seat right side sensor 5 and second seat right side sensor 6 are connected through another series of bus lines.

The operation of this vehicle occupant protection system in an event of a front crash and a side crash is described below.

In the event of a collision on the front right side of the vehicle, the vehicle receives a large degree of acceleration in the front to back direction immediately after the collision. The front to back acceleration sensor 31 in the ECU 1 detects this large acceleration in the front to back direction. Moreover, because of the impact on the front right side, the right front sensor 3 detects a large degree of acceleration in the front to back direction. Also, the left front sensor 4 detects a large degree of acceleration in the front to back direction even when the vehicle has crashed on the front right side.

Acceleration signals output from the front to back acceleration sensor 31 are directly input to the microprocessor 33 in the ECU 1, and acceleration signals output from the right front sensor 3 and left front sensor 4 are input to the microprocessor 33 over the bus lines B1 and B2, and bus I/F 35 and bus control circuit 34 in the ECU 1.

The microprocessor 33 then determines whether the collision is on the front of the vehicle based on the input acceleration signals. More specifically, if the integral of acceleration signals detected by the front to back acceleration sensor 31 exceeds a predetermined threshold, and if the integral of acceleration signals detected by either one of the right front sensor 3 and the left front sensor 4 exceeds a predetermined threshold, then the microprocessor 33 decides that the vehicle has crashed on the front side.

Following this determination made by the microprocessor 33, the ignition circuit 36 supplies energizing current to the squibs 37 of the occupant protection units that are provided in precaution of a front crash. The protection units are the driver's side front air bag 21, front passenger's side front air bag 22, right side pretensioner 27, and left side pretensioner 28 shown in FIG. 2. As the power is supplied to the squibs 37, these protection units are activated.

In the event of a collision on the left side of the vehicle, the vehicle receives a large degree of acceleration in the left to right direction immediately after the collision. The lateral acceleration sensor 32 in the ECU 1 detects this large acceleration in the left to right direction. Moreover, the lateral acceleration sensor 2 disposed outside the ECU 1 detects a large degree of acceleration in the left to right direction. Further, because of the impact on the left side of the vehicle, the first seat left side sensor 7 or the second seat left side sensor 8 detects a large degree of acceleration in the left to right direction.

Acceleration signals output from the lateral acceleration sensor 32 are directly input to the microprocessor 33 in the ECU 1, and acceleration signals output from the lateral acceleration sensor 2 are input to the microprocessor 33 over the bus line B3, and bus I/F 35 and bus control circuit 34 in the ECU 1. Acceleration signals output from the first seat left side sensor 7 are input to the microprocessor 33 over the bus lines B4 and B3, bus I/F 35, and bus control circuit 34. Further, acceleration signals output from the second seat left side sensor 8 are input to the microprocessor 33 over the bus lines B5, B4, and B3, bus I/F 35, and bus control circuit 34.

The microprocessor 33 then determines whether the collision is on the left side of the vehicle based on the input acceleration signals. More specifically, if the integral of acceleration signals detected by either the lateral acceleration sensor 32 in the ECU 1 or the lateral acceleration sensor 2 outside the ECU 1 exceeds a predetermined threshold, and if the integral of acceleration signals detected by either one of the first seat left side sensor 7 and the second seat left side sensor 8 exceeds a predetermined threshold, then the microprocessor 33 decides that the vehicle has crashed on the left side.

Following this determination made by the microprocessor 33, the ignition circuit 36 supplies energizing current to the squibs 37 of the occupant protection units that are provided in precaution of a side collision. The protection units are the left side bag 24, left side curtain bag 26, and left side pretensioner 28 shown in FIG. 2. As the power is supplied to the squibs 37, these protection units are activated.

If the vehicle crashes on the right side, the system operates the same as described above with the right side sensors 5, 6 instead of the left side sensors 7, 8.

Next, a description is made as to the case where one of the bus lines B3-B5 used for the determination of a side collision is disconnected. When the bus line B3 is disconnected, all the acceleration signals output from the lateral acceleration sensor 2, first seat left side sensor 7, and second seat left side sensor 8 are not input to the microprocessor 33 in the ECU 1. In this case, therefore, the system cannot determine a left-side collision. Further, no determination can be made as to a right-side collision using the lateral acceleration sensor 2. When the bus line B4 is disconnected, acceleration signals from the first seat left side sensor 7 and second seat left side sensor 8 are not input to the microprocessor 33. In this case, too, the system cannot determine a left-side collision. However, the system can still determine a right-side collision using the lateral acceleration sensor 2. When the bus line B5 is disconnected, acceleration signals from the second seat left side sensor 8 are not input to the microprocessor 33, while the acceleration signals from the lateral acceleration sensor 2 and first seat left side sensor 7 are input to the microprocessor 33. In this case, the system can determine a left-side collision of the first seat, but not of the second seat. However, the system can still determine a right-side collision using the lateral acceleration sensor 2.

Thus, by connecting the lateral acceleration sensor 2 that is used for the determination of both a left-side and right-side collision closer to the ECU 1, it is avoided as much as possible that a bus line disconnection immediately disables the system's function of determining a right-side collision as well as a left-side collision. That is, the disadvantage of cascade connection is reduced to make good use thereof, as a result of which a cost reduction is achieved.

Figure 6:
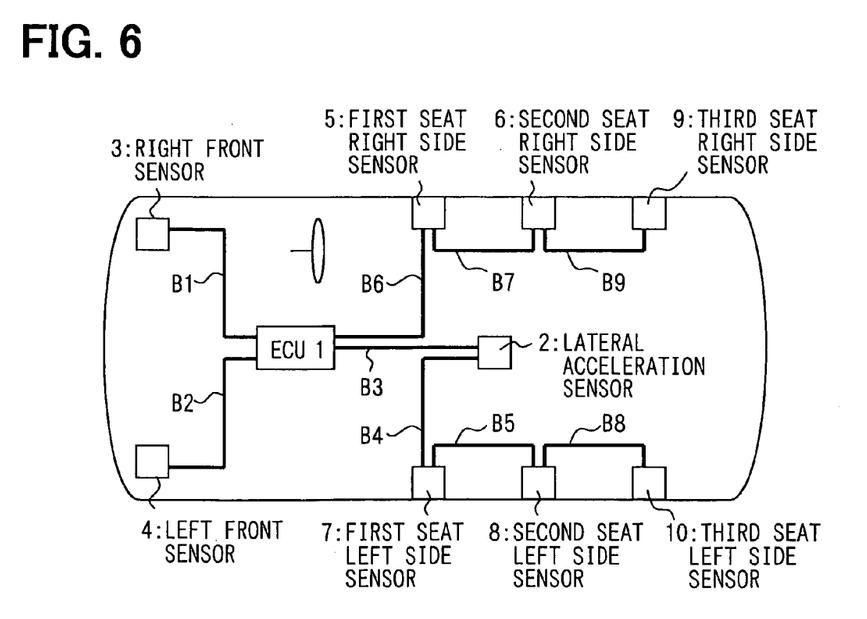
FIG. 6 is a plan view of a vehicle including a vehicle occupant protection system according to a second embodiment of the present invention.

A second embodiment of a vehicle occupant protection system is described next with reference to FIG. 6, which shows the overall layout of the system. As compared to the first embodiment described above, the system further includes a third seat right side sensor 9 and a third seat left side sensor 10. The third seat right side sensor 9 is bus-connected to the second seat right side sensor 6 through a bus line B9. The third seat left side sensor 10 is bus-connected to the second seat left side sensor 8 through a bus line B8.

The system determines a side collision on the third seat in the following manner. If the integral of acceleration signals detected by the lateral acceleration sensor 2 outside the ECU 1 exceeds a predetermined threshold, and if the integral of acceleration signals detected by the third seat left side sensor 10 exceeds a predetermined threshold, then the microprocessor 33 decides that the vehicle has crashed on the left side of the third seat. A right-side collision determination is made similarly using the right side sensors. Side collision determination on the first or second seat is made as has been described above.

If any of the bus lines B4, B5, or B8 is disconnected, the system cannot make part or all of the left-side collision determination, but can still determine a right-side collision using the lateral acceleration sensor 2, since the acceleration signals from this sensor are input to the microprocessor 33.

Thus, as with the first embodiment, by connecting the lateral acceleration sensor 2 that is used for the determination of both a left-side and right-side collision closer to the ECU 1, it is avoided as much as possible that a bus line disconnection immediately disables the system's function of determining a right-side collision as well as a left-side collision. This second embodiment has more advantages in that it achieves the same effects as with the first embodiment while the possibility of a bus line disconnection is increased because of the added bus lines B8 and B9.

Figure 7:
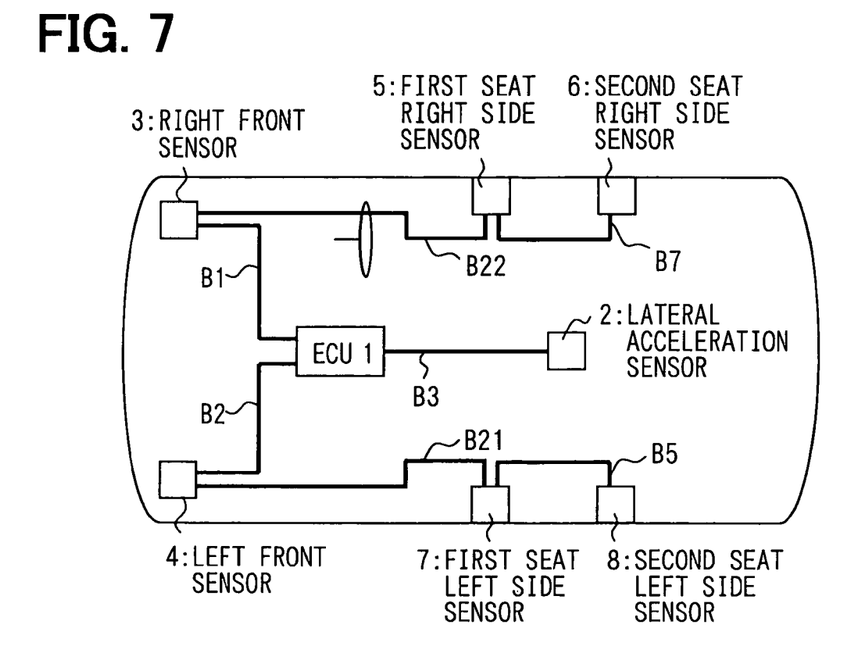
FIG. 7 is a plan view of a vehicle including a vehicle occupant protection system according to a third embodiment of the present invention.

Next, the overall structure of the vehicle occupant protection system according to a third embodiment is described with reference to FIG. 7. The system has a different bus line connection configuration from that of the first embodiment. The elements in FIG. 7 that are the same as those in FIG. 1 are given the same reference numerals and will not be described again. As shown in the drawing, the vehicle occupant protection system includes an electronic control unit (ECU) 1, a plurality of satellite sensors 2-8, and bus lines B1-B3, B5, B7, B21, and B22 for bus-connecting the sensors. Description of the ECU 1 and satellite sensors 2-8 will be omitted as these are the same as those of the first embodiment.

The bus lines connect the satellite sensors with the ECU 1 or with each other. Bus line B1 connects the right front sensor 3 with the ECU 1. Bus line B2 connects the left front sensor 4 with the ECU 1. Bus line B3 connects the lateral acceleration sensor 2 with the ECU 1. Bus line B21 connects the left front sensor 4 with the first seat left side sensor 7. Bus line B5 connects the first seat left side sensor 7 with the second seat left side sensor 8. Bus line B22 connects the right front sensor 3 with the first seat right side sensor 5. Bus line B7 connects the first seat right side sensor 5 with the second seat right side sensor 6.

The operation of this vehicle occupant protection system in an event of a front crash and a side crash is described below.

In the event of a collision on the front of the vehicle, the system of the second embodiment operates similarly to the first embodiment, and therefore the description thereof will be omitted.

In the event of a collision on the left side of the vehicle, the vehicle receives a large degree of acceleration in the left to right direction immediately after the collision. The lateral acceleration sensor 32 in the ECU 1 detects this large acceleration in the left to right direction. Moreover, the lateral acceleration sensor 2 disposed outside the ECU 1 detects a large degree of acceleration in the left to right direction. Further, because of the impact on the left side of the vehicle, the first seat left side sensor 7 or the second seat left side sensor 8 detects a large degree of acceleration in the left to right direction.

Acceleration signals output from the lateral acceleration sensor 32 are directly input to the microprocessor 33 in the ECU 1, and acceleration signals output from the lateral acceleration sensor 2 are input to the microprocessor 33 over the bus line B3, and bus I/F 35 and bus control circuit 34 in the ECU 1. Acceleration signals output from the first seat left side sensor 7 are input to the microprocessor 33 over the bus lines B21 and B2, bus I/F 35, and bus control circuit 34. Further, acceleration signals output from the second seat left side sensor 8 are input to the microprocessor 33 over the bus lines B5, B21, and B2, bus I/F 35, and bus control circuit 34.

The microprocessor 33 then determines whether the collision is on the left side of the vehicle based on the input acceleration signals. More specifically, if the integral of acceleration signals detected by either the lateral acceleration sensor 32 in the ECU 1 or the lateral acceleration sensor 2 outside the ECU 1 exceeds a predetermined threshold, and if the integral of acceleration signals detected by either one of the first seat left side sensor 7 and the second seat left side sensor 8 exceeds a predetermined threshold, then the microprocessor 33 decides that the vehicle has crashed on the left side.

Following this determination made by the microprocessor 33, the ignition circuit 36 supplies energizing current to the squibs 37 of the occupant protection units that are provided in precaution of a side crash. The protection units are the left side bag 24, left side curtain bag 26, and right side pretensioner 28 shown in FIG. 2. As the power is supplied to the squibs 37, these protection units are activated. If the vehicle crashes on the right side, the system operates the same as described above with the right side sensors 5, 6 instead of the left side sensors 7, 8.

Next, a description is made as to the case where one of the bus lines B2, B21, and B5 is disconnected. When the bus line B2 is disconnected, all the acceleration signals output from the left front sensor 4, first seat left side sensor 7, and second seat left side sensor 8 are not input to the microprocessor 33 in the ECU 1. In this case, therefore, the system cannot determine a left-side collision. Likewise, no collision determination using the left front sensor 4 can be made. When the bus line B21 is disconnected, acceleration signals from the first seat left side sensor 7 and second seat left side sensor 8 are not input to the microprocessor 33. In this case, too, the system cannot determine a left-side collision. However, the system can still determine a collision using the left front sensor 4. When the bus line B5 is disconnected, acceleration signals from the second seat left side sensor 8 are not input to the microprocessor 33, while the acceleration signals from the left front sensor 4 and first seat left side sensor 7 are input to the microprocessor 33. In this case, the system can determine a left-side collision of the first seat, but not of the second seat. The system can still determine a collision using the left front sensor 4.

The same applies as the above when any of the bus lines B1, B22, and B7 is disconnected, except that the associated sensors are all right side sensors.

Thus, by connecting the front sensor that is used for the determination of a front collision closer to the ECU 1, it is avoided as much as possible that a bus line disconnection causes the system to be partially disabled to determine a front collision, which is the most frequent case of collision or rollover events. That is, the disadvantage of cascade connection is reduced to make good use thereof, as a result of which a cost reduction is achieved.

Figure 8:
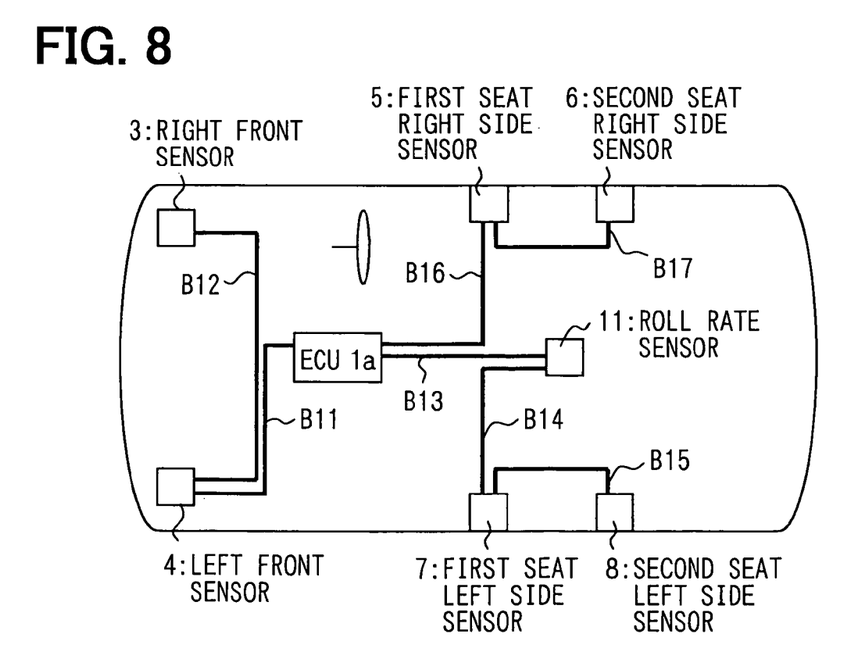
FIG. 8 is a plan view of a vehicle including a vehicle occupant protection system according to a fourth embodiment of the present invention.

Next, the overall structure of a vehicle occupant protection system according to a fourth embodiment is described with reference to FIG. 8. The elements in FIG. 8 that are the same as those in FIG. 1 are given the same reference numerals and will not be described again. As shown in the drawing, the vehicle occupant protection system includes an electronic control unit (ECU) 1a, a plurality of satellite sensors 3-8 and 11, and bus lines B11-B17 for bus-connecting the sensors.

Figure 9:
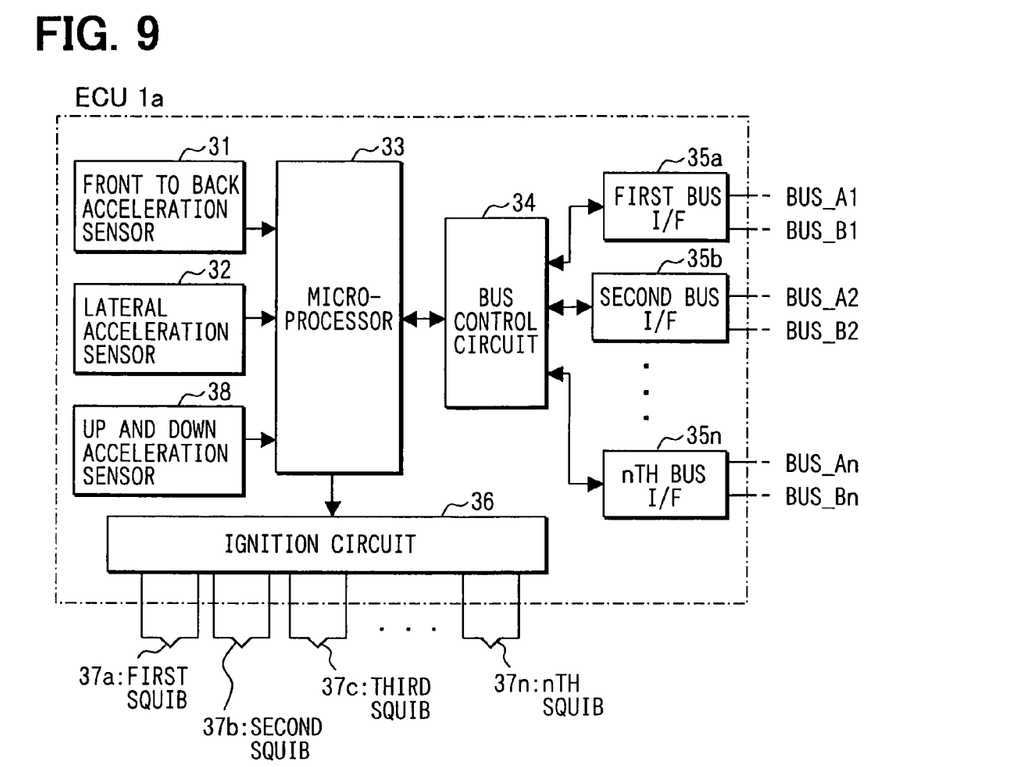
FIG. 9 is a block diagram of an electronic control unit of the vehicle occupant protection system of FIG. 8.

The structure of the ECU 1a is described in detail with reference to the block diagram of FIG. 9. As shown, the ECU 1a includes a front to back acceleration sensor 31, a lateral acceleration sensor 32, an up and down acceleration sensor 38, a microprocessor 33, a bus control circuit 34, bus interfaces (I/F) 35a-35n, and an ignition circuit 36. The front to back acceleration sensor 31 detects acceleration generated in the front to back direction of the vehicle. The elements of the ECU 1a that are the same as those of ECU 1 of the first embodiment are given the same reference numerals and will not be described again. The up and down acceleration sensor 38 detects acceleration generated in the up and down direction of the vehicle at a location at which the ECU 1a is disposed. The other features are the same as the first embodiment.

The satellite sensors 3-8, 11 are disposed outside the ECU 1a in associated parts of the vehicle. The satellite sensors in the fourth embodiment comprise a right front sensor 3, a left front sensor 4, a first seat right side sensor 5, a second seat right side sensor 6, a first seat left side sensor 7, a second seat left side sensor 8, and a roll rate sensor 11.

The roll rate sensor 11 is located in the rear of the ECU 1a. The roll rate sensor 11 detects the rate of roll around a front to back axis of the vehicle. The other satellite sensors are the same as those of the first embodiment and will not be described again.

The bus lines B11-B17 connect the satellite sensors with the ECU 1a or with each other. Bus line B11 connects the left front sensor 4 with the ECU 1a. Bus line B12 connects the left front sensor 4 with the right front sensor 3. Bus line B13 connects the roll rate sensor 11 with the ECU 1a. Bus line B14 connects the roll rate sensor 11 with the first seat left side sensor 7. Bus line B15 connects the first seat left side sensor 7 with the second seat left side sensor 8. Bus line B16 connects the first seat right side sensor 5 with the ECU 1a. Bus line B17 connects the first seat right side sensor 5 with the second seat right side sensor 6.

The operation of this vehicle occupant protection system in an event of a front crash, a side crash, and a rollover is described below.

In the event of a collision on the front right of the vehicle, the vehicle receives a large degree of acceleration in the front to back direction immediately after the collision. The front to back acceleration sensor 31 in the ECU 1a detects this large acceleration in the front to back direction. Moreover, because of the impact on the front right side, the right front sensor 3 detects a large degree of acceleration in the front to back direction. Also, the left front sensor 4 detects a large degree of acceleration in the front to back direction even though the vehicle has crashed on the front right side.

Acceleration signals output from the front to back acceleration sensor 31 are input to the microprocessor 33 in the ECU 1a, and acceleration signals output from the left front sensor 4 are input to the microprocessor 33 over the bus line B11, and bus I/F 35 and bus control circuit 34 in the ECU 1a. Further, acceleration signals output from the right front sensor 3 are input to the microprocessor 33 over the bus lines B12 and B11, bus I/F 35, and bus control circuit 34.

The microprocessor 33 then determines whether the collision is on the front of the vehicle based on the input acceleration signals. More specifically, if the integral of acceleration signals detected by the front to back acceleration sensor 31 exceeds a predetermined threshold, and if the integral of acceleration signals detected by either one of the right front sensor 3 and the left front sensor 4 exceeds a predetermined threshold, then the microprocessor 33 decides that the vehicle has crashed on the front side.

Following this determination made by the microprocessor 33, the ignition circuit 36 supplies energizing current to the squibs 37 of the occupant protection units that are provided in precaution of a front crash. The protection units are the driver's side front air bag 21, front passenger's side front air bag 22, right side pretensioner 27, and left side pretensioner 28 shown in FIG. 2. As the power is supplied to the squibs 37, these protection units are activated.

In the event of a collision on the left side of the vehicle, the vehicle receives a large degree of acceleration in the left to right direction immediately after the collision. The lateral acceleration sensor 32 in the ECU 1a detects this large acceleration in the left to right direction. Moreover, because of the impact on the left side of the vehicle, the first seat left side sensor 7 or the second seat left side sensor 8 detects a large degree of acceleration in the left to right direction.

Acceleration signals output from the lateral acceleration sensor 32 are input to the microprocessor 33, and acceleration signals output from the first seat left side sensor 7 are input to the microprocessor 33 over the bus lines B14 and B13, and bus I/F 35 and bus control circuit 34 in the ECU 1a. Further, acceleration signals output from the second seat left side sensor 8 are input to the microprocessor 33 over the bus lines B15, B14 and B13, bus I/F 35, and bus control circuit 34.

The microprocessor 33 then determines whether the collision is on the left side of the vehicle based on the input acceleration signals. More specifically, if the integral of acceleration signals detected by either the lateral acceleration sensor 32 in the ECU 1a or the lateral acceleration sensor 2 outside the ECU 1a exceeds a predetermined threshold, and if the integral of acceleration signals detected by either one of the first seat left side sensor 7 and the second seat left side sensor 8 exceeds a predetermined threshold, then the microprocessor 33 decides that the vehicle has crashed on the left side.

Following this determination made by the microprocessor 33, the ignition circuit 36 supplies energizing current to the squibs 37 of the occupant protection units that are provided in precaution of a side crash. The protection units are the left side bag 24, left side curtain bag 26, and left side pretensioner 28 shown in FIG. 2. As the power is supplied to the squibs 37, these protection units are activated.

If the vehicle crashes on the right side, the system operates the same as described above with the right side sensors 5, 6 instead of the left side sensors 7, 8.

In the event of a rollover of the vehicle, roll rate, left to right acceleration, and up and down acceleration are generated in the vehicle immediately after the rollover. The roll rate sensor 11 outside the ECU 1a detects a large roll rate. Further, the lateral acceleration sensor 32 inside the ECU 1a detects a large degree of acceleration in the left to right direction. Moreover, the up and down acceleration sensor 38 in the ECU 1a detects acceleration in the up and down direction.

Acceleration signals output from the lateral acceleration sensor 32 and from the up and down acceleration sensor 38 are directly input to the microprocessor 33 in the ECU 1a. Further, roll rate signals output from the roll rate sensor 11 are input to the microprocessor 33 over the bus line B13, and bus I/F 35 and bus control circuit 34 in the ECU 1a.

The microprocessor 33 then determines whether the vehicle has rolled over based on the input lateral/up and down acceleration and roll rate data. This technique of determining a rollover is known in the art, for example, as disclosed in Japanese Patent Laid-Open Publication No. 2001-260786, and will not be described in detail. The microprocessor 33 also determines whether the vehicle has rolled over based on the input lateral acceleration and roll rate data. This technique of determining a rollover is known in the art, for example, as disclosed in Japanese Patent Laid-Open Publication No. 2001-260781, and will not be described in detail.

Following this determination made by the microprocessor 33, the ignition circuit 36 supplies energizing current to the squibs 37 of the occupant protection units that are provided in precaution of a rollover. The protection units are the right side curtain bag 25, left side curtain bag 26, right side pretensioner 27, and left side pretensioner 28 shown in FIG. 2. As the power is supplied to the squibs 37, these protection units are activated.

Next, a description is made as to the case where one of the bus lines B13-B15 is disconnected. When the bus line B13 is disconnected, all of the roll rate and acceleration signals output from the roll rate sensor 11, first seat left side sensor 7, and second seat left side sensor 8 are not input to the microprocessor 33 in the ECU 1a. In this case, therefore, the system can determine neither a left-side collision, nor a rollover. When the bus line B14 is disconnected, acceleration signals from the first seat left side sensor 7 and second seat left side sensor 8 are not input to the microprocessor 33. In this case, too, the system cannot determine a left-side collision. However, the system can determine a rollover using the roll rate sensor 11, since the roll rate signals are still input to the microprocessor 33. When the bus line B15 is disconnected, acceleration signals from the second seat left side sensor 8 are not input to the microprocessor 33, while the roll rate signals from the roll rate sensor 11 and acceleration signals from the first seat left side sensor 7 are input to the microprocessor 33. In this case, the system can determine a left-side collision of the first seat, but not of the second seat. The system can still determine a rollover.

If the roll rate sensor 11 were connected farther from the ECU 1a with one or more side sensors interposed therebetween, then a bus line disconnection would immediately affect the system's abilities of detecting a side collision as well as a rollover.

Thus, when two or more side sensors are connected to each other for detecting the same vehicle condition, for example, a side collision, they should be located farther from the ECU 1a while the single roll rate sensor 11 should be connected nearer to the ECU 1a, where it is less susceptible to the effects of a bus line disconnection, so that the bus line disconnection does not immediately affect the determination of a rollover. Thereby, the damage of a bus line disconnection in cascade connection is minimized. That is, the disadvantage of cascade connection is reduced to make good use thereof, as a result of which a cost reduction is achieved.

While the roll rate sensor 11 is disposed outside of the ECU 1a and the lateral acceleration sensor 32 and up and down acceleration sensor 38 inside the ECU 1a in the third embodiment of the vehicle occupant protection system, this is not a requirement and one of the acceleration sensors 32 and 38 may be disposed outside the ECU 1a and the roll rate sensor 11 inside the ECU 1a.

What is claimed is:

1. A vehicle occupant protection system comprising:
   a plurality of satellite sensors for detecting a vehicle condition;
   a control unit for determining an occurrence of a vehicle event based on output signals from the plurality of satellite sensors and for controlling activation of an occupant protection unit; and
   a plurality of bus lines bus-connecting the control unit and the plurality of satellite sensors, wherein
   a group of the plurality of satellite sensors including three or more of the plurality of satellite sensors are connected in series via at least one of the plurality of bus lines, and
   one of the group is operable to determine at least two different vehicle conditions, the one of the group being bus-connected closer to the control unit than the other sensors in the group.

2. The vehicle occupant protection system according to claim 1, wherein:
   each of the plurality of satellite sensors include:
   a lateral acceleration center sensor located substantially along a centerline of the width of the vehicle and capable of detecting acceleration in a left to right direction of the vehicle,
   a plurality of left side sensors located on the left side of the vehicle for detecting a collision on the left side of the vehicle, and
   a plurality of right side sensors located on the right side of the vehicle for detecting a collision on the right side of the vehicle; and
   the control unit determines a left-side collision based on output signals from at least one of the lateral acceleration center sensor and the plurality of left side sensors and determines a right-side collision based on output signals from at least one of the lateral acceleration center sensor and the plurality of right side sensors; and
   at least one of the pluralities of left and right side sensors are connected in series through a plurality of bus lines with the lateral acceleration center sensor such that the lateral acceleration center sensor is bus-connected closer to the control unit than the at least two of one of the left and right side sensors.

3. The vehicle occupant protection system according to claim 2, wherein
the at least one of the pluralities of left and right side sensors one of all left side sensors and all right side sensors.

4. A vehicle occupant protection system comprising:
a front sensor located on a front side of a vehicle and capable of detecting acceleration in a front to back direction of the vehicle;
at least one satellite sensor capable of detecting a vehicle condition;
a control unit for determining an occurrence of a vehicle event based on output signals from the front sensor and the at least one satellite sensor and for controlling activation of an occupant protection unit; and
a plurality of bus lines for bus-connecting the control unit and the front sensor and the at least one satellite sensor, wherein
the front sensor is connected in series with at least one of the at least one satellite sensor via at least one of the plurality of bus lines and is bus-connected closer to the control unit than the at least one of the at least one satellite sensor connected in series therewith.

5. The vehicle occupant protection system according to claim 4, wherein
the at least one satellite sensor includes at least one side sensor located on a side of the vehicle for detecting a side collision.

6. The vehicle occupant protection system according to claim 4, wherein
the at least one satellite sensor includes at least one of a left side sensor and a right side sensor, which are respectively located on the left and right side of the vehicle for detecting a left-side collision and a right-side collision.

7. The vehicle occupant protection system according to claim 6, wherein
the at least one of the left side sensor and the right side sensor each include at least two side sensors.

8. The vehicle occupant protection system according to claim 2, wherein
the plurality of left side sensors located on the left side of the vehicle include a lateral acceleration sensor capable of detecting acceleration in the left to right direction of the vehicle, and
the plurality of right side sensors located on the right side of the vehicle include a lateral acceleration sensor capable of detecting acceleration in the left to right direction of the vehicle.

9. The vehicle occupant protection system according to claim 6, wherein
the left side sensor located on the left side of the vehicle includes a lateral acceleration sensor capable of detecting acceleration in the left to right direction of the vehicle, and
the right side sensor located on the right side of the vehicle includes a lateral acceleration sensor capable of detecting acceleration in the left to right direction of the vehicle.

10. The vehicle occupant protection system according to claim 2, wherein
the plurality of left side sensors located on the left side of the vehicle include a pressure sensor capable of detecting pressure applied on the left side of the vehicle, and
the plurality of right side sensors located on the right side of the vehicle include a pressure sensor capable of detecting pressure applied on the right side of the vehicle.

11. The vehicle occupant protection system according to claim 6, wherein
the left side sensor located on the left side of the vehicle includes a pressure sensor capable of detecting pressure applied on the left side of the vehicle, and
the right side sensor located on the right side of the vehicle includes a pressure sensor capable of detecting pressure applied on the right side of the vehicle.

12. A vehicle occupant protection system comprising:
a plurality of satellite sensors capable of detecting a vehicle condition;
a control unit for determining the occurrence of a vehicle event based on output signals from the plurality of satellite sensors and for controlling activation of an occupant protection unit; and
a plurality of bus lines for bus-connecting the control unit and the plurality of satellite sensors, wherein
a group of the plurality of satellite sensors includes at least three of the plurality of satellite sensors connected in series through at least one of the plurality of bus lines, the group including at least two common sensors for detecting a common vehicle condition, the at least two common sensors being bus-connected farther from the control unit than the other satellite sensors in the group.

13. The vehicle occupant protection system according to claim 12, wherein:
the plurality of satellite sensors include:
a rollover detection sensor for detecting a vehicle condition in a vehicle rollover event, and
a plurality of side sensors located on the sides of the vehicle for detecting a side collision of the vehicle, wherein
the rollover detection sensor is bus-connected closer to the control unit than the plurality of side sensors.

14. The vehicle occupant protection system according to claim 13, wherein
the rollover detection sensor is at least one of a roll rate sensor capable of detecting roll rate generated in the vehicle, an up and down acceleration sensor capable of detecting acceleration in an up and down direction of the vehicle, and a lateral acceleration sensor capable of detecting acceleration in a left to right direction of the vehicle.

15. The vehicle occupant protection system according to claim 13, wherein
the rollover detection sensor is located substantially along a centerline of the width of the vehicle.

16. The vehicle occupant protection system according to claim 1, wherein
the plurality of bus lines are configured as a daisy chain.

17. The vehicle occupant protection system according to claim 4, wherein
the plurality of bus lines are configured as a daisy chain.

18. The vehicle occupant protection system according to claim 12, wherein
the plurality of bus lines are configured as a daisy chain.

* * * * *